Sept. 26, 1944.   E. R. MARK   2,358,816
TOOL POST TURRET BLOCK
Filed March 1, 1943
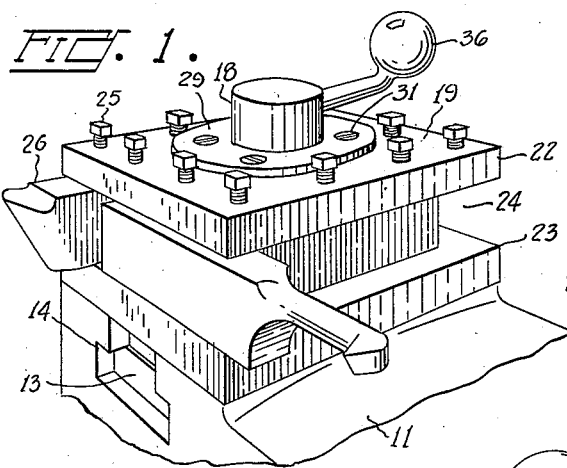
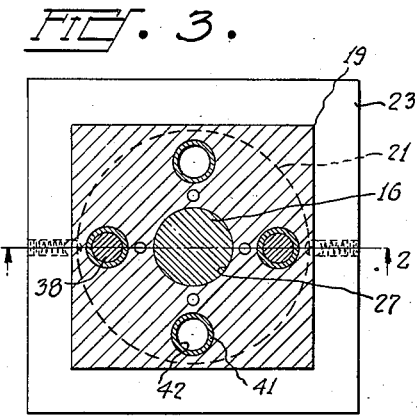
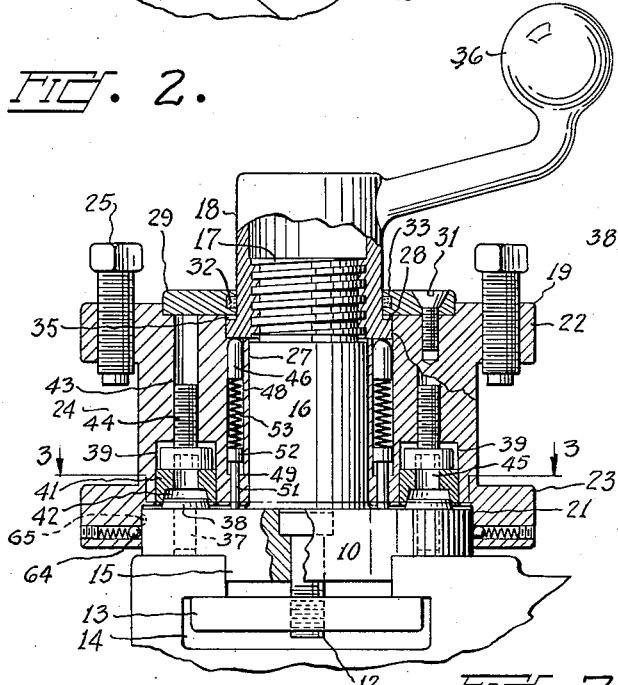
INVENTOR
EDWARD R. MARK
BY
Harold D. Cook
ATTORNEY Patented Sept. 26, 1944

2,358,816

UNITED STATES PATENT OFFICE 2,358,816

TOOL POST TURRET BLOCK

Edward R. Mark, Portland, Oreg.

Application March 1, 1943, Serial No. 477,655

6 Claims. (Cl. 29—49)

This invention relates to tool posts of the turret type for lathes and other similar machines, and particularly to a tool post turret block capable of holding a plurality of tools and movable into a plurality of positions to bring said tools into operative relation with the workpiece.

It is a primary object of the invention to provide a multiple tool holder for successively moving machine tools into operative relation with a workpiece with a high degree of accuracy.

It is a further object of the invention to provide in a tool post turret block means for adjusting indexing parts to restore machine accuracy when inaccuracies occur by reason of wear.

It is a further object of the invention to provide a means of making adjustments of working parts to compensate for wear without disassembly of the turret block.

It is a further object of the invention to provide in a tool post turret block means to facilitate ease of operation, and accuracy and permanency of adjustment.

It is a further object of the invention to provide in a tool post turret block means for indexing the block to move tools into operative relation with a workpiece which requires movement of the operating lever only through an angle corresponding to the indexing angle.

It is a further object of the invention to provide a tool post turret block having means for maintaining angular alignment of the block and indexing means after disengagement of the block from its base and prior to engagement with means for creating the next indexing movement.

With these and other objects and advantages in mind, the invention resides in the novel construction and combination of parts hereinafter described, illustrated in the accompanying drawing, and set forth in the appended claims; it being understood that various changes in form, proportion, size, and details of construction within the scope of the claims may be resorted to without departing from the spirit or sacrificing any of the advantages of the invention.

In the drawing: Figure 1 is a perspective view of a tool post turret block embodying the invention; Figure 2 is a vertical section taken on the line 2—2 of Figure 3; Figure 3 is a horizontal section taken on the line 3—3 of Figure 2; Figure 4 is a plan view, partly in section, of the base with the turret block removed; Figure 5 is a fragmentary vertical section showing a modified structure embodying the invention, and showing the turret block in position to be rotated; Figure 6 is an end view of the nut showing the detent holes; and Figure 7 is a fragmentary sectional elevation taken on the line 7—7 of Figure 6.

A tool post turret block embodying the invention is described as having a circular base 10 mounted upon the usual cross slide 11 of a lathe by means of cap screws 12 which extend through the base 10 and engage a plate 13 mounted in the slot 14 of the cross slide 11. The plate 13 is of a length substantially equal to the diameter of the base 10 and the cap screws 12 extend through the base 10 at diametrically opposite points and engage the plate 13 adjacent opposite ends thereof. The cap screws 12 are countersunk in the base and may be provided with hollow heads for engagement by a hexagonal tool. The base 10 is provided with a generally rectangular boss 15 closely fitting the T slot 14 for maintaining the tool post in accurate alignment with the workpiece. Extending upwardly from the center of the base 10 is a post 16 having threads 17 at its upper end for the reception of a nut 18.

Mounted on the base 10 is a turret block 19 provided in its lower face with a circular recess 21 within which is received the upper portion of the base 10. The drawing illustrates the turret block as having four sides of equal length and having an upper flange 22 and a lower flange 23 defining a tool receiving recess 24. Set screws 25 extend through the upper flange 22 for clamping tools 26 against the lower flange 23. Four tools may be mounted on a turret block of the configuration shown, and each of these tools may selectively be brought into position for operation on the workpiece in the manner presently to be described.

The turret block 19 is provided with an axial bore 27 for the reception of the post 16, by means of which the block 19 is centered on the base. The bore 27 is enlarged adjacent its upper end for the reception of a lateral flange 28 on the end of the nut 18. A collar 29 closely fitting the nut 18 over the flange 28 is secured to the upper face of the turret block 19 as by machine screws 31. A sealing ring 32 mounted in a groove 33 in the inner periphery of the collar 29 prevents abrasive materials from entering the bore 27.

Enlargement of the axial bore 27 in the turret block 19 forms an annular shoulder 34 adapted to be engaged by the flanged end of the nut 18 when the nut is turned down on the thread 17 to lock the block in operative position. It will be noted that the thickness of the flange 28 on the nut 18 is less than the depth of the enlarged portion of the bore 27, so that the shoulder 34 lies at a greater distance from the upper face of the turret block 19 than is occupied by the flange 28 on the nut. Thus, when the nut 18 is turned down tightly against the shoulder 34, as shown in Figure 2, a space 35, equal to approximately one fourth of the pitch of the thread 17, is created between the flange 28 and the collar 29. By reason of the space 35, when the operating lever 36 is turned in the counterclockwise direction, to cause the nut to disengage the thread 17, the lever may be turned through an arc of approximately ninety degrees before the flange 28 engages the under side of the collar 29. Further rotation of the operating lever 36 in this direction moves the turret block 19 axially of the post 16 away from the base 10. Conversely, rotation of the operating lever 36 in the clockwise direction, to cause the nut to engage the threads 17, causes the flange 28 to engage the shoulder 34 and locks the turret block 19 upon the base 10.

The base 10 is bored at diametrically opposite points for the reception of locking pins 37, each of these locking pins being provided with a tapered head 38 projecting upwardly from the base 10. The lower face of the turret block 19 is formed with four recesses 39, these being spaced ninety degrees apart, each diametrically opposite two thereof being movable into correlated positions with the locking pins 37. Preferably, each of said recesses is fitted with a hardened steel bushing 41 forming a tapered socket 42 to receive the correspondingly tapered heads 38 of the locking pins 37. Communicating with each of the recesses 39 is a tapped hole 43 in which is mounted a hollow head cap screw 44. These cap screws provide means for adjusting the tapered bushings 41 to compensate for wear of either the bushings or the locking pins. As illustrated in the drawing, the recesses 39 are of sufficient depth to receive both the bushings 41 and the heads of the cap screws 44. When the block is assembled the cap screws are first threaded into the tapped holes 43 with the heads deep in the recesses 39 to permit the bushings 41 to be pressed into place. Each bushing 41 is provided with an opening 45 so that an appropriate tool may be inserted therethrough into engagement with the screw 44 for turning the screw to adjust the bushing.

In Figure 5 is illustrated a structure in which bushings 58, defining sockets 59 for engagement with the locking pins 37, are provided with threaded shanks 61 by which they are adjustably mounted in recesses 62 in the lower face of turret block 56. Each bushing 58 is provided with an appropriately shaped recess 63 for reception of a tool for adjusting the bushing to compensate for wear. To make adjustments of the bushings, in either of the structures illustrated, it is necessary only to rotate the nut 18 to disengage the threads 17 and to lift the turret block 19 off the post 16, thus exposing the lower face of the block. Thereupon, by turning the screw 44 or the bushing 58, as the case may be, adjustments may be made to compensate for wear.

For rotating the turret block 19 after the same has been lifted clear of the locking pins 37, oppositely disposed detents 46 are mounted in the turret block closely adjacent the periphery of the bore 27 for engaging with detent holes 47 in the lower face of the flange 28 on the nut 18. In the structure illustrated in Figure 2, the detents 46 are mounted in bores 48 which extend through the turret block. Adjacent the lower face of the turret block each bore 48 is of reduced diameter forming a shoulder 49 and mounted in this reduced portion of the bore is a pin 51 adapted to project from the lower end of the bore into engagement with the upper surface of the base 10. Each pin 51 is provided with a head 52 which engages the shoulder 49 and prevents displacement of the pin from the bore. A spring 53, bearing at one end against the head 52 of the pin 51 and at the other end aginst the detent 46, urges the detent into engagement with one of the detent holes 47. Each of the pins 51 is of sufficient length to bear against the surface of the base 10 at all times during indexing and locking positions of the block. That is to say, the pins 51 project from the lower face of the block 19 a distance greater than the height of the tapered heads 38 on the locking pins 37. By reason of this construction, the turret block 19 is not subject to stresses created by the spring 53, the detent structure, comprising the detents 46, springs 53, and pins 51, loosely mounted for axial movement therein.

In Figure 5 is illustrated a turret block 56 embodying a modification of the detent structure wherein recesses 54 in which are mounted detents 55 terminate within the body of the turret block 56, so that each spring 57 bears at one end against the block 56 and at the other end against the detent 55. While the detent structure illustrated is operable to cause rotation of the turret block upon rotation of the lever 36, nevertheless the amount of frictional resistance offered thereby is considerably greater than in the construction illustrated in Figure 2. In the construction shown in Figure 2 the stresses imposed by the spring 53 are not only applied to the block 19, and not only is the block more easily operated but the wear on the indexing parts is considerably lessened.

Operation

Having mounted the herein described tool post turret block on the cross slide 11 of a lathe or other similar machine, the operation thereof and the advantages inherent therein may be described as follows:

Assume, for purposes of illustration, that the pitch of the thread 17 on the end of the post 16 is exactly the same as on the tool post turret blocks heretofore manufactured and sold by applicant. In these devices there are six threads to the inch, and the axial movement of the nut is .166 inch per revolution of the lever 36. The tapered heads 38 of the locking pins 37 project upwardly from the face of the base 10 a distance of .120 inch. The heads 38 are provided with a 5° taper and the sockets 42 in the bushings 41 are correspondingly tapered.

Assume first that the turret block 19 is in locked position on the base 10 with the locking pins 37 engaging in the sockets 42. Also that appropriate tools are mounted in the tool recess 24. Rotation of the lever 36 through an angle of ninety degrees from the locked position in the counterclockwise direction moves the nut 18 axially of the post 16 to a point where the flange 28 engages the under side of the collar 29. As the nut is rotated through one complete revolution, the detents 46 successively engage and disengage the recesses 47 in the flange 28, the turret block 19 being held against rotation by engagement of the locking pins 37 with the sockets 42. After the flange 28 has engaged the under surface of the collar 29, each quarter turn of the lever 36 in the counterclockwise direction raises the turret block 19 approximately .0415 inch until, upon having completed one revolution of the lever, the turret block 19 is lifted axially of the post 16 a distance of .1245 inch and the block is clear of the tapered heads 38 of the locking pins 37. To insure accurate angular alignment of the sockets 42 in the turret block with respect to the locking pins 37, after the block has completely disengaged the base and prior to engagement of the detents 46 with the detent holes 47, applicant provides a detent 64 mounted in the flange 23 and urged into engagement with the detent hole 65 in the circular wall of the base 10 by means of a spring 66. The detent hole 65 is so positioned in the wall of the base 10 that the detent 64 engages therein just prior to the moment that the sockets 42 are lifted clear of the tapered heads 38 of the locking pins. In the construction shown the sockets 42 are lifted clear of the locking pins 37 just prior to the time that the lever 36 completes one revolution in the counterclockwise direction from the locked position herein described. The function of the detent 64 is to hold the turret block 19 stationary until the nut has been rotated through the remainder of one complete revolution of the lever in the counterclockwise direction to the indexing position. Thereupon the detents 46 engage in the detent holes 47 in the nut 18 and the nut and turret block are thus interlocked for unitary rotation until such time as the sockets 42 reengage the locking pins 37 as hereinafter described.

Rotation of the lever 36 in the clockwise direction from the indexing position, to restore the turret block 19 to locked position, rotates the turret block through an angle of ninety degrees to bring the next successive tool into operating position. Briefly stated, one revolution of the lever 36 in the counterclockwise direction to the indexing position, plus one revolution of the lever 36 in the clockwise direction to the starting point or locked position, automatically shifts the turret block through an angle of ninety degrees to place a new tool in working position.

In the event the tool next to be used is not the tool next in order of rotation of the block in the clockwise direction, the desired tool may be brought into working position by rotating the lever repeatedly through an angle of ninety degrees from the indexing position, first in the clockwise direction, second in the counterclockwise direction, and then in the clockwise direction, through the same ninety degree angle, until the desired tool shall be moved to working position, whereupon the lever may be rotated the remaining three quarters of a revolution in the clockwise direction to lock the turret block on the locking pins.

The space 35, provided between the flange 28 on the nut 18 and the collar 29, is productive of advantages which may not be apparent from a casual inspection of the drawing. A distinct advantage resides in the permitted action of the block when the lever is turned in the clockwise direction from the indexing position. (The "indexing position" is the position of the lever at one full revolution in the counterclockwise direction from the locked position). Upon rotating the lever from the indexing position in the clockwise direction, the turret block 19 is permitted to follow the lever for one quarter turn, at which point the sockets 42 initially engage the locking pins 37, and, by reason of the fact that the block is loosely mounted on the nut 18, the block thereupon drops freely onto the tapered heads 38 of the locking pins with the tapered heads engaging in the sockets 42. It is advisable to pause slightly in the clockwise rotation of the lever 36 at this point to permit the sockets 42 to drop over the tapered heads 38 before rotating the lever 36 to the locked position. By reason of this construction, the amount of wear which otherwise could be expected to take place between the locking pins 37 and bushings 41 is considerably lessened.

Having now described my invention and in what manner the same may be used, what I claim as new and desire to protect by Letters Patent is:

1. A tool post turret block comprising a circular base having a post projecting upwardly from the center thereof, threads on the end of said post and a pair of locking pins projecting upwardly from said base, a turret block mounted upon said base and engaging said post for rotation relative thereto, means defining a tool recess in said block, a plurality of recesses in the lower face of said block adapted to be brought into correlated position with respect to said locking pins, bushings mounted in said recesses defining sockets for engagement with said locking pins, a tapped bore extending through said block in alignment with each said recess, a hollow head cap screw mounted behind each of said bushings and having threads engaging in said bore, and means defining an opening through each said bushing for the insertion therethrough of an appropriate tool for turning said cap screw.

2. A tool post turret block comprising a circular base having an upstanding post formed integrally therewith, threads on the end of said post, a pair of locking pins mounted in said base and projecting upwardly therefrom, a turret block mounted on said base and engaging said post for rotation relative thereto, means defining a plurality of sockets in the lower face of said block for engaging said locking pins, a nut mounted on said threads and loosely engaging said block for rotation relative thereto, a detent mounted in said block and engaging said nut for enabling unitary rotation of said block and said nut, resilient means tending to move said detent into engagement with said nut, means projecting from said block and engaging said base and forming a seat for said resilient means whereby the stresses imposed by said resilient means are applied solely to said base and said detent.

3. In a tool post turret block, a base, a post on said base, threads on said post, a block mounted on said base and engaging said post for rotation relative thereto, a nut mounted on said threads and loosely engaging said block for rotation relative thereto, a detent mounted in said block, a spring mounted in said block and engaging one end of said detent for urging said detent into engagement with said nut, a pin mounted in said block and projecting therefrom into engagement with said base, one end of said spring being seated on said pin, said detent, spring and pin being loosely mounted in said block for axial movement relative thereto.

4. In a tool post turret block, a base, an upstanding post on said base, threads on said post, a nut mounted on said threads, a turret block mounted on said base and engaging said post for rotation relative thereto, a recess in said block annularly of said post and forming an annular shoulder, a flange on said nut adapted to engage said shoulder and lock said block on said base, the depth of said recess above said shoulder being greater than the thickness of said flange, and a collar secured to said block and extending over said flange whereby rotation of said nut in a direction to disengage said thread will cause said flange to engage said collar and lift said block, said flange having limited axial movement between said shoulder and said collar.

5. In a tool post turret block, a base, an upstanding post on said base, threads on said post, a nut mounted on said threads, a turret block mounted on said base and engaging said post for rotation relative thereto, a recess in said block annularly of said post, a flange on said nut extending into said recess, a collar secured to said block and engaging said nut over said flange, a medial groove in the inner periphery of said collar and a sealing ring mounted in said collar and engaging said nut for preventing foreign materials from entering said recess.

6. A tool post turret block comprising a circular base having an upstanding post formed integrally therewith, threads on the end of said post, a pair of locking pins mounted in said base and projecting upwardly therefrom, a turret block mounted on said base and engaging said post for rotation relative thereto, means defining a plurality of sockets in the lower face of said block for engaging said locking pins, a nut mounted on said threads and loosely engaging said block for rotation relative thereto, means secured to said block and adapted to be engaged by said nut for lifting said block upon rotation of said nut, a detent mounted in said block, means defining detent holes in said nut for engaging said detent upon rotation of said nut through a predetermined angle with respect to said block, a second detent mounted in said block, means defining a detent hole in said base for engaging said detent during a time that said sockets are in engagement with said locking pins, said second detent being operable to hold said turret block stationary after disengagement of said sockets from said locking pins and prior to engagement of said first named detents with said means defining detent holes in said nut.

EDWARD R. MARK.